United States Patent
Davis et al.

[11] Patent Number: 5,454,949
[45] Date of Patent: Oct. 3, 1995

[54] SEWAGE TREATMENT SYSTEM & METHOD

[76] Inventors: Harold E. Davis, 37 Champney St., Groton, Mass. 01450; Donald C. Bullock, 31 Loggin Rd., Concord, N.H. 03304

[21] Appl. No.: 176,255

[22] Filed: Jan. 3, 1994

[51] Int. Cl.⁶ .................................................. C02F 3/06
[52] U.S. Cl. .......................... 210/617; 210/622; 210/138; 210/196; 210/201
[58] Field of Search ..................... 210/617, 618, 210/150, 151, 621–624, 138, 614, 195.1, 196, 199, 201, 203

[56] References Cited

U.S. PATENT DOCUMENTS

| | | | |
|---|---|---|---|
| 4,009,099 | 2/1977 | Jeris | 210/618 |
| 4,818,404 | 4/1989 | McDowell | 210/617 |
| 4,954,257 | 9/1990 | Vogelpohl et al. | 210/617 |
| 5,080,793 | 1/1992 | Urlings | 210/617 |
| 5,228,997 | 7/1993 | Martin et al. | 210/617 |

Primary Examiner—Thomas Wyse
Attorney, Agent, or Firm—Abraham Ogman

[57] ABSTRACT

The invention is directed to a sewage treatment system comprising a tank in which biological treatment by microorganisms occur in mixed liquor and a circulating loop for removing mixed liquor from the tank and returning oxygen enriched aerated mixed liquor to the tank. The mixed liquor is removed and returned to the tank through a pair spaced apart submerged filters. One alternative construction is to use a pressure tank in the circulation loop to increase the percentage of dissolved oxygen in the aerated mixed liquor.

10 Claims, 4 Drawing Sheets

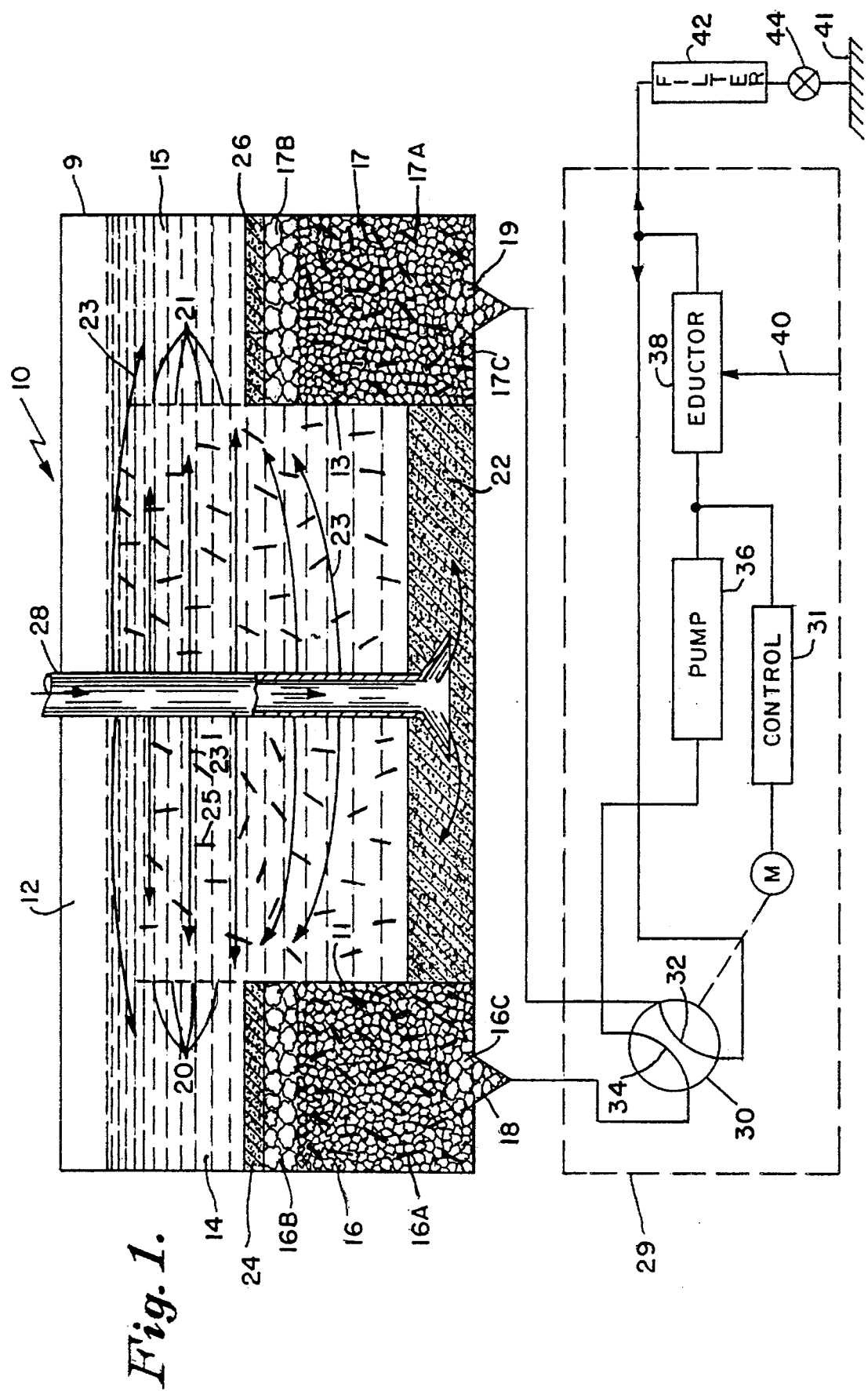

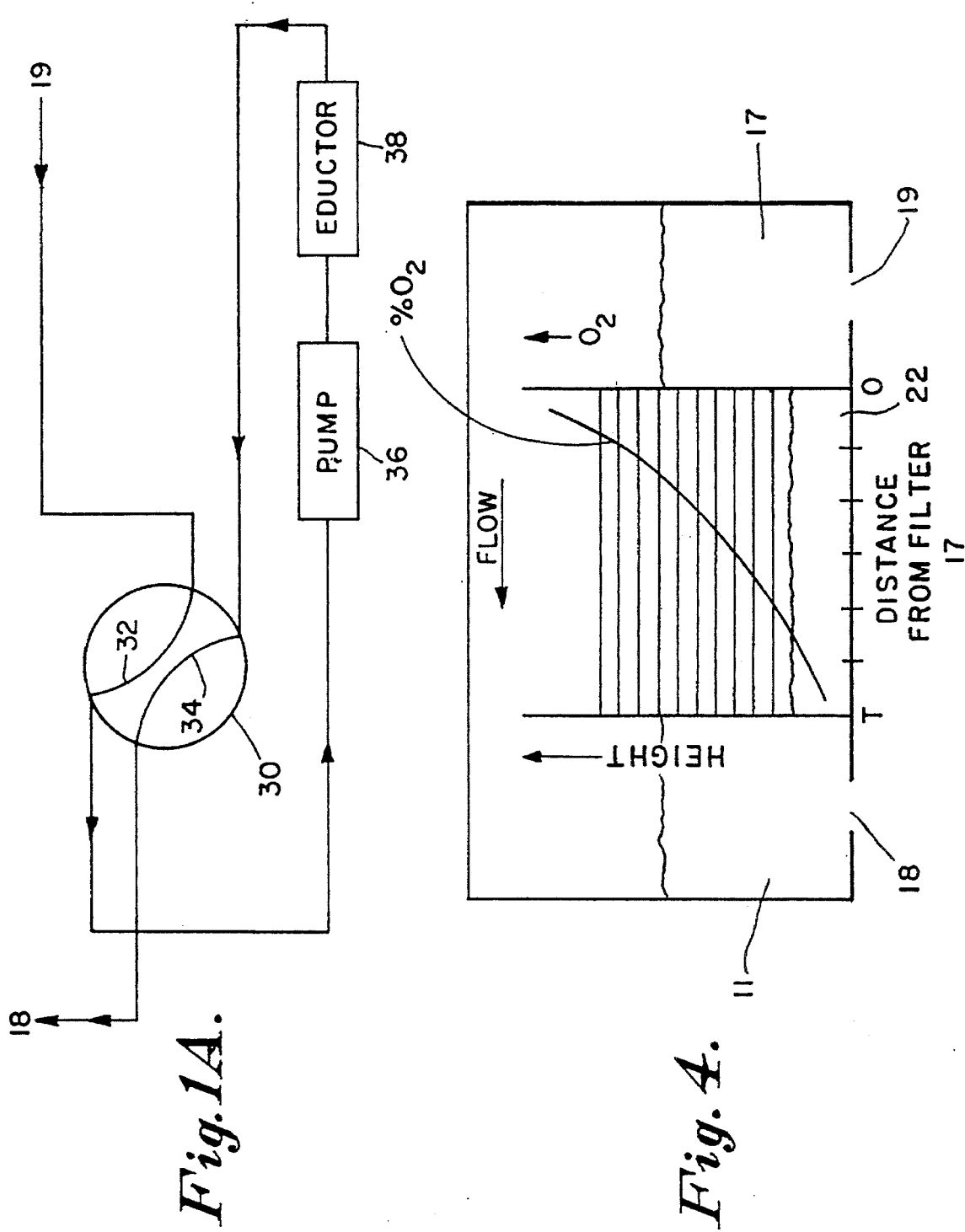

5,454,949

SEWAGE TREATMENT SYSTEM & METHOD

INTRODUCTION

The invention is directed to a sequencing batch sewage treatment system which includes a tank for holding and treating mixed liquor and sewage and a circulation loop for continuously taking oxygen depleted mixed liquor from the tank and for supplying aerated mixed liquor to the tank. The tank includes spaced apart submerged filters which form an underwater reversing- backwash filter system. Mixed liquor from the tank enters the circulation loop and is returned to the tank via the filters. The aerated mixed liquor stimulates aerobic biological treatment for efficient and thorough treatment of the sewage. The result is secondary and advanced sewage treatment in the course of which suspended solids, phosphates, and nitrogen are removed.

The sequencing batch system described and claimed is particularly suited to small capacity units for homes or a small community of homes, Also under favorable conditions the concept may be adapted to continuous or semi-continuous operation, particularly when the volume of influent is very small relative to the size of the reactor tank so that the influent does not increase the level of biological oxygen demand (BOD) within the reactor tank.

DEFINITIONS

Aerobic and anaerobic treatments are used in the conventional sense to mean biological treatment by microorganisms in oxygen rich and oxygen starved environments, respectively. Aerobic treatment is a nitrification process. Anaerobic is a denitrification process.

Mixed liquor is sewage containing volatile suspended solids.

The term reversing-backwash filter system shall designate a pair of filters one of which acts to filter mixed liquor leaving a tank while the other is being backwashed by aerated mixed liquor entering the tank.

KNOWN PRIOR ART

Filters have formed an integral part of sewage treatment plants for many years. Filters have been used as residence sites for microorganisms to enhance aerobic and anaerobic action as well as performing classic mechanical filtering. No art has been found where an underwater reversing-backwash filter is used in conjunction with a mixed liquor circulation loop for adding air into mixed liquor.

Mixed liquor has been removed from a treatment tank and returned as motive liquor for an "aerator" in the Omniflo™ system reputedly covered by Pat. Nos. 4,648,967; 4,645,592; 4,711,716; 4,724,073; and 4,775,467. In the Omniflo system literature reviewed there is no mention of filters and the air supply is separate from the recirculation system during biological treatment.

OBJECTS OF THE INVENTION

It is an object of the invention to provide a sewage treatment tank which avoids the limitations and disadvantages of prior systems.

It is another object of the invention to provide a continuous supply of aerated mixed liquor to sequencing batch sewage treatment processes.

It is another object of the invention to incorporate a reversing-backwash filter system in a sewage treatment tank.

It is another object of the invention to continuously introduce aerated mixed liquor into a sequencing batch sewage treatment tank.

It is another object of the invention to provide a sewage treatment system for septic tanks which substitutes a much smaller dispersing field for dispersing fully treated effluent for the leaching fields for septic tanks as they are currently constructed and function.

It is another object of the invention to provide a sewage treatment system for septic tanks which provides secondary and advanced treatment of the sewage which includes the removal of suspended solids, nitrogen and phosphorous.

It is still another object of the invention to treat the effluent from a septic tank aerobically and anaerobically in a simple and efficient manner.

It is still another object of the invention to treat the effluent from a septic tank in a tank containing "attached growth" residence sites for accelerating the microorganism digestion processes.

It is also an object of the invention to adjust the flow rate of mixed liquor through the and filters to allow sludge to settle to the bottom of the tank.

It is yet another object of the invention to provide submerged filtering means within the tank which functions like a trickle filter to filter and biologically treat the mixed liquor circulated to and from the tank.

It is also an object of the invention to provide a sewage treatment system utilizing pressure means to increase the concentration of dissolved oxygen in the mixed liquor for increasing the aerobic biological treatment rate of the microorganisms.

It is still another object of the invention to provide a pressure vessel containing microorganisms in aerated mixed liquor for increasing the residence time of microorganisms in the aerated mixed liquor and for increasing the population of the microorganisms in the aerated mixed liquor in the pressure vessel.

BRIEF DESCRIPTION OF THE INVENTION

In accordance with the invention there is a tank which receives a predetermined amount of a mixed liquor from a septic tank or other source for treatment. The mixed liquor is circulated through the tank to the first of two filters. The mixed liquor passes through the first filter, leaves the tank and passes to a circulation loop where it is mixed with external air to replenish dissolved oxygen used by the microorganisms in biological treatment. The replenished mixed liquor may be pressurized if desired, before it is returned through a second filter to the tank.

Aerobic digestion—nitrification—of the mixed liquor takes place in the aerated, oxygen enriched, mixed liquor. Also, as the mixed liquor passes through the tank the oxygen is consumed setting up anaerobic, denitrification, regions where suspended solids, phosphates and nitrogen are removed.

It is known that microorganisms work better under attached growth conditions which occur when microorganisms are attached to residence sites such as the surfaces of media like sand, stones or plastic media or attached on the surfaces of suspended solids.

Alternatively, the invention embodies the use of a coarse media as the top layer in each filter or in separate chambers where the mixed liquor is moving at a low velocity. The coarse media acts as residence sites for attached growth and the production of sludge which eventually gravitates to the bottom of the tank.

Another alternative embodiment is to place a pressure vessel into the circulation loop for receiving the aerated mixed liquor for further increasing the volume of dissolved oxygen in the mixed liquor and thereby increasing the biological digestion activity within the circulation loop.

The invention together with further objects and advantages will be best understood by reference to the following detailed description when taken in conjunction with the accompanying drawings.

DESCRIPTION OF THE FIGURES

FIG. 1 is a schematic representation of a sewage treatment tank embodying the principles of the present invention;

FIG. 1A shows an alternate setting for a reversing valve for reversing the flow of mixed liquor to and from the tank.

FIG. 4 is a curve which shows the relative distribution of dissolved oxygen within a treatment compartment within the tank.

DETAILED DESCRIPTION OF THE INVENTION

Figure 2:
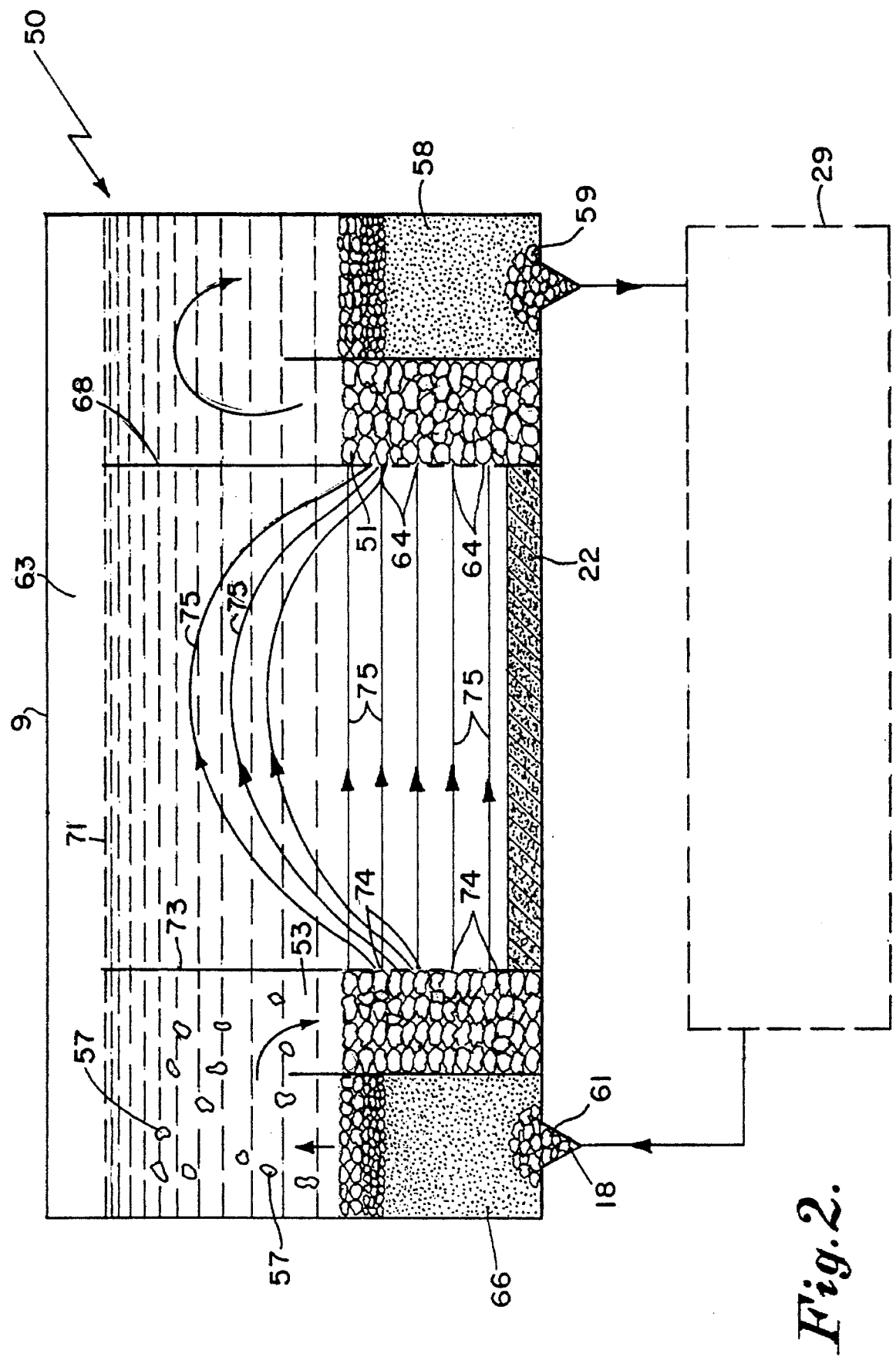
FIG. 2 depicts the FIG. 1 tank with a pair of low velocity settling chambers contain coarse media.

Referring to FIG. 1 there is depicted a schematic representation of a sewage treatment tank system 10 embodying the principles of the present invention. Specifically, the tank system 10 includes a tank 9 containing a treatment compartment 12, a pair of spaced apart partitions 11 and 13 defining filter compartments 14 and 15 containing filters 16 and 17. Each of the filters 16 and 17 contain small solid particles 16A and 17A such as small particles of sand or coal, or the combination of sand and coal, or other media sized like grains of sand. A layer of coarse media, 16B or 17B such as stones, coal, plastic and the like, in the order of 1 to 2 inches in diameter is deposited on top of the sand 16A and 17A.

Mixed liquor enters and leaves the compartments 14 and 15 through pipes 18 and 19 respectively. A deposit of pea sized stones 16C and 17C cover pipe 18 and 19, respectively. A plurality of holes 20 and 21 are defined in the partitions 11 and 13, respectively.

An accumulation of sludge 22 sits on the bottom of the treatment compartment 12 between the two partitions 11 and 13. Influent is supplied to the treatment compartment 12 through a pipe 28 to the bottom of the tank in order to provide nutrients to the microorganisms residing in the sludge 22 to stimulate the production of mixed liquor at the start and during the treatment cycle.

Mixed liquor circulating through the tank 9 is designated 23. The filters 16 and 17, comprise a filter -backwashing system. They are submerged in the mixed liquor 23. The small particles 25 associated with the mixed liquor 23 are intended to designate suspended sludge or other minute solids that are suspended in the mixed liquor.

Additional sludge 24A and 26A, is to be found on top of the sand 16A and 17A. Layers 24 and 26 on top of the coarse media 16B, and 17B are further sludge deposits.

The flow rate of the mixed liquor through the treatment compartment 12 is very slow, very tranquil, and as imperceptible as possible. Further the volume per unit of time of mixed liquor flowing through the treatment compartment 12 is small relative to the volume of mixed liquor in the tank 9 assuring a long residence time within the treatment chamber 12 to allow the microorganisms to consume as much BOD available in the compartment and thereby complete the biological treatment of the mixed liquor. This type of tranquil flow also permits the sludge produced to precipitate out to the bottom of the compartment 12.

The tank 10 also includes a circulation loop 29 which includes a reversing valve 30 shown schematically in FIG. 1. The reversing valve 30 contains a pair of passages 32 and 34 that are designed to be reciprocated 90 degrees either manually or by means of an electrical device such as a motor 31. In practice valve 30 may take the form of a single valve or a combination of pipes and valves.

A pump 36 is provided to increase the pressure of the mixed liquor flowing through the circulation loop 29. The outlet of the pump 36 is coupled to the input of an aerator, such as an eductor 38 or the output of a compressor. Air is supplied to the eductor 38 via pipe 40. The volume of fluid, air plus mixed liquor leaving the eductor is greater than the volume of mixed liquor entering the pump.

A filter 42 is coupled via a valve 44 to the outlet of eductor 38. Treated effluent is removed from the tank through the filter 42 which is provided as a safety device to prevent residual suspended solids from leaving the system. The valve 44 is coupled to a small dispersing field 41.

In the state of the art septic system a relatively large dispersing field to further treat and to disperse the partially treated effluent from the septic tank. The effluent from this sewage treatment system is fully treated and requires only enough room to disperse into the ground In FIG. 1 the passage 34 connects the pipe 18 to the pump 36. The passage 32 connects the output of the eductor 38 to the pipe 19. As a consequence the flow of mixed liquor from the tank 9 passes through filter 16, through pipe 18 to pump 36. The pump 36 delivers mixed liquor to the eductor 38 where it is mixed with air coming from pipe 40.

The mixed liquor leaving the eductor 38 is hereinafter designated aerated mixed liquor. The oxygen enriched aerated mixed liquor in this instance is coupled through passage 32 to pipe 19. Thus mixed liquor leaves the tank 9 via filter 16 and pipe 18. Oxygen enriched aerated mixed liquor is returned to the tank via pipe 19 and filter 17.

Referring to FIG. 1A the reversing valve is shown rotated 90 degrees counterclockwise from its FIG. 1 orientation. Passage 32 now connects the pipe 19 to the pump 36 for removing mixed liquor from the tank 9 through filter 17.

Passage 34 in FIG. 1A connects the outlet of the eductor 38 to pipe 18 for returning oxygen enriched mixed liquor to the tank 9 through the filter 16.

OPERATION OF THE FIG. 1 Tank

The sewage treatment system 10 is designed as a sequential batch tank so at some point in time a predetermined quantity of influent is supplied through pipe 28 to the tank 9. The preferred use of the sewage treatment system 10 is in single residences or small residential clusters.

The preferred influent is the output of a septic tank where solids have settled. The influent enters the tank 9 through the pipe 28 and is mixed with the sludge deposit 22. In the normal course of events residual biological treatment by microorganisms continues in the sludge after the conclusion of a treatment cycle. The incoming influent provides nutrients to the residual microorganisms that remain in the sludge after the conclusion of the last treatment cycle. With the addition of the nutrients the microorganism population explodes and treatment begins in earnest. The influent then percolates through the sludge 22 to fill the tank 9.

When the treatment cycle starts and throughout the treatment cycle oxygen enriched mixed liquor, powered by the pump 36 in the circulation loop 29, is fed to the treatment compartment 12 between the two filters 15 and 17. The flow of oxygen enriched mixed liquor continues for the duration of the treatment cycle until the mixed liquor is fully treated. The duration of the treatment cycle is determined by the volume of influent that is transferred into the tank 9.

In the FIG. 1 illustration the flow is from right to left from filter 17 to filter 15. The holes 20 and 21 in the partitions 11 and 13 along with the flow over the top of the partitions 11 and 13 tend to broaden the flow vertically so as to discourage turbulence to permit the suspended solids and the sludge produced from the mixed liquor in treatment compartment 12 to settle to the bottom of the treatment compartment 12.

Mixed liquor taken from the treatment compartment 12 through the filter 15 passes through the reversing valve 30 to the input of the pump 36.

The purposes of the filter 15 and filter 17 are twofold. The first is to capture particles of sludge or particles suspended in the mixed liquor entering the filter 15 to produce deposits 24 and 26.

The second purpose is to provide sites for attached growth biological treatment of the mixed liquor flowing through the filters to take place.

The stone deposits 16C and 17C above pipes 18 and 19 are used to distribute mixed liquor entering the filters from the circulation loop 29 and to reduce "channeling" the flow of mixed liquor through the filters particularly during backwashing. Placing the coarse media 16B and 17B on top of the sand also reduces channeling.

The pump 36 raises the velocity and pressure of the mixed liquor it receives and couples the mixed liquor to the eductor 38 where the mixed liquor is mixed with incoming air to form an oxygen enriched aerated mixed liquor. The air supplied to the eductor through pipe 40 may be at ambient pressure or supplied under pressure from a compressor.

Aerobic digestion on mixed liquor starts immediately and vigorously when air is ingested in the eductor and continues as the aerated mixed liquor enters the tank through filter 17 and proceeds to treatment compartment 12, filter 15 and back to the eductor 38.

The mixed liquor flowing through filter 17 backwashes the filter 17. The accumulated sediment layer 26 comprising sludge and solids are lifted from the surface of the filter of the sand 17A and coarse media 17B respectively. The lifted sediment is carried by the flow of the mixed liquor through and over the partition 13 into the treatment compartment 12.

The undissolved air in the mixed liquor escapes through the open top of the tank 9. The mixed liquor streams slowly and tranquilly from right to left where it passes through and over partition 11 to filter 15.

Aerobic treatment takes place throughout the oxygen rich mixed liquor stream above the filters and in the treatment compartment 12 in proportion to the amount of dissolved oxygen remaining in the stream. As dissolved oxygen is consumed by the microorganisms there is formed a more or less steady state gradient of oxygen as represented in FIG. 4.

FIG. 4 shows that the dissolved oxygen in the mixed liquor entering treatment compartment 12 is at a relatively high level. As the mixed liquor proceeds from the partition 13 and moves toward the partition 11 the dissolved oxygen content of the mixed liquor decreases because of aerobic digestion utilizes large quantities of oxygen.

There is, therefore, developed a decreasing vertical and horizontal gradient of dissolved oxygen in treatment compartment 12 with oxygen starvation occurring in the region just above the sludge deposit 22 where the influent is introduced. After the influent stream is terminated denitification takes place in this region because of the lack of oxygen.

The depth of the denitification region 24 is constantly shifting as it depends of the concentration of oxygen dissolved in the mixed liquor and this, in turn, is dependant of the aerobic digestion process taking place above, as well as the amount of carbon available as food.

Clearly, the aerated mixed liquor entering the filter 17 contains the maximum amount of dissolved oxygen. It is equally clear that the mixed liquor leaving the filter 15, in this illustration being described, contains the minimum amount of dissolved oxygen. The maximums and minimums will vary with time as treatment proceeds.

A very important aspect of the invention is that filtering and backwashing is achieved with a single pump and a simple aerator, such as eductor 38, which is capable of putting a larger volume of fluid, in the form of the mixed liquor and air, through the filter in the backwash mode than is removed in the filtering mode. This is true even if some of the treated mixed liquor is removed through filter 42 as effluent.

The direction of flow of mixed liquor through the tank 9 may be controlled by a timing device or when conditions dictate. For example, when a filter begins to clog less water flows through the filter. As a consequence, a pressure drop will occur at the outlet of the pump. The control 31 will note the drop in pressure and rotate the reversing switch 30, 90 degrees to reverse the flow of mixed liquor in the tank 9.

For a typical group of 4–5 homes a 1100 gallon tank will handle one days worth of peak sewage flow. A typical batch would be about 25% of system capacity or about 300 gallons. If the flow of mixed liquor through the treatment tank is about 4–5 gallons per minute, a typical batch can be treated in 6 hours.

ALTERNATIVE Tank

There is depicted in FIG. 2 an alternative tank 50 containing a pair of compartments 52 and 53 each containing a column of coarse stones or other media 51 and 54. Typically, the diameters of the media, in these compartments are also in the order of magnitude, 1 to 2 inches. The stones are submerged in the mixed liquor 71 being treated.

In FIG. 2 the filters are designated 58 and 66. The filters are accessed from compartments 52 and 53 through passages 64 and 74 defined in partitions 68 and 73. The filters are coupled to the circulation loop through pipes 18 and 19 as in FIG. 1. Filters 58 and 66 each contain a bed of fine particles of sand, coal or other media and pea sized stone 59 and 61. The filters 58 and 66 are submerged in the mixed liquor 71 being circulated through the tank 50.

In FIG. 2, mixed liquor from the circulation loop 29, aerated mixed liquor, is shown entering the alternative tank 50 through pipe 18. In this case, the aerated mixed liquor backwashes the filter 66 and picks up the sediment 57 that accumulated in and on the media in this filter 66 when the filter was filtering mixed liquor. The sludge goes into suspension in the aerated mixed liquor that is washing the filter 66.

The mixed liquor with suspended sediment and remaining dissolved oxygen passes into compartment 53 where it encounters coarse media 54 which provides sites for "attached growth" to aid in the digestion by microorganisms. Much of the sludge produced on the surfaces of the coarse media settles to the bottom of the compartment 53.

The mixed liquor passes out of the compartment 53 into the treatment compartment 63 through the holes 74 defined in the wall 73.

The mixed liquor leaves the compartment 63 through holes 64 into the compartment 52 where it proceeds upward through the stones 51, through filter 58 after depositing sludge and solids on the sand.

As is well known in a Trickling Filter art, microorganisms work more efficiently when attached to a surface such as stones or to volatile suspended solids. The phenomenon is called Attached Growth. The growth occurring on these surfaces is sludge which is produced as biological digestion proceeds. The sludge built up on the sites for attached growth, builds up on the sites until there is sufficient buildup to cause the sludge to fall off the sites and gravitate toward the bottom of the compartment where the sludge joins other previously accumulated and undigested sludge.

Because the flow of mixed liquor through the tank and compartments is so tranquil the sludge accumulating on the stones can fall off even against the flow in the compartment. The settling process proceeds more rapidly when the flow of mixed liquor through the coarse media flows toward the bottom of the tank during the backwash process of the adjacent filter.

Some denitrification takes place just above the sludge deposited in the compartments 52 and 53 but not a great deal as the mixed liquor in the compartment is generally too rich in oxygen. The remainder of suspended sludge and mixed liquor volatiles proceeds into the main treatment compartment 63 where the vigorous aerobic digestion continues as previously described. The aerobic action consumes oxygen dissolved in the mixed liquor.

The flow of mixed liquor proceeds essentially as indicated from compartment 53 by the flow lines 75 from the holes 74 to and through holes 64 into the compartment 52. As in FIG. 1 the volume of the tank 50 is very large relative to the rate of the flow rate of the mixed liquor through the main treatment compartment 63. The mixed liquor resides in the tank 50 for a substantial time to allow for substantial biological treatment to occur. The flow is also very slow, very tranquil, and as imperceptible as possible to allow the sludge produced to settle to the bottom of the treatment compartment 63.

Virtually all of the dissolved oxygen in the mixed liquor in the compartment 63 is utilized in the digestion process. A meaningful anoxic, dentrification, treatment process is carried on in and about the sludge deposit 77 in the manner described for FIG. 1. The nitrogen and carbon dioxide gases produced during anoxic digestion escapes through the top of the tank.

The mixed liquor in compartment 52 moves upward through the stones 51 and exits to the filter 58 and out of the alternative tank 50 through pipe 19 to the circulation loop 29. The circulation loop performs in the manner described in FIG. 1.

After a time, the water leaving the tank 50 is fully treated and may be removed as an effluent from system via the circulation loop as previously described.

PRESSURIZED CIRCULATION SUBASSEMBLY

Figure 3:
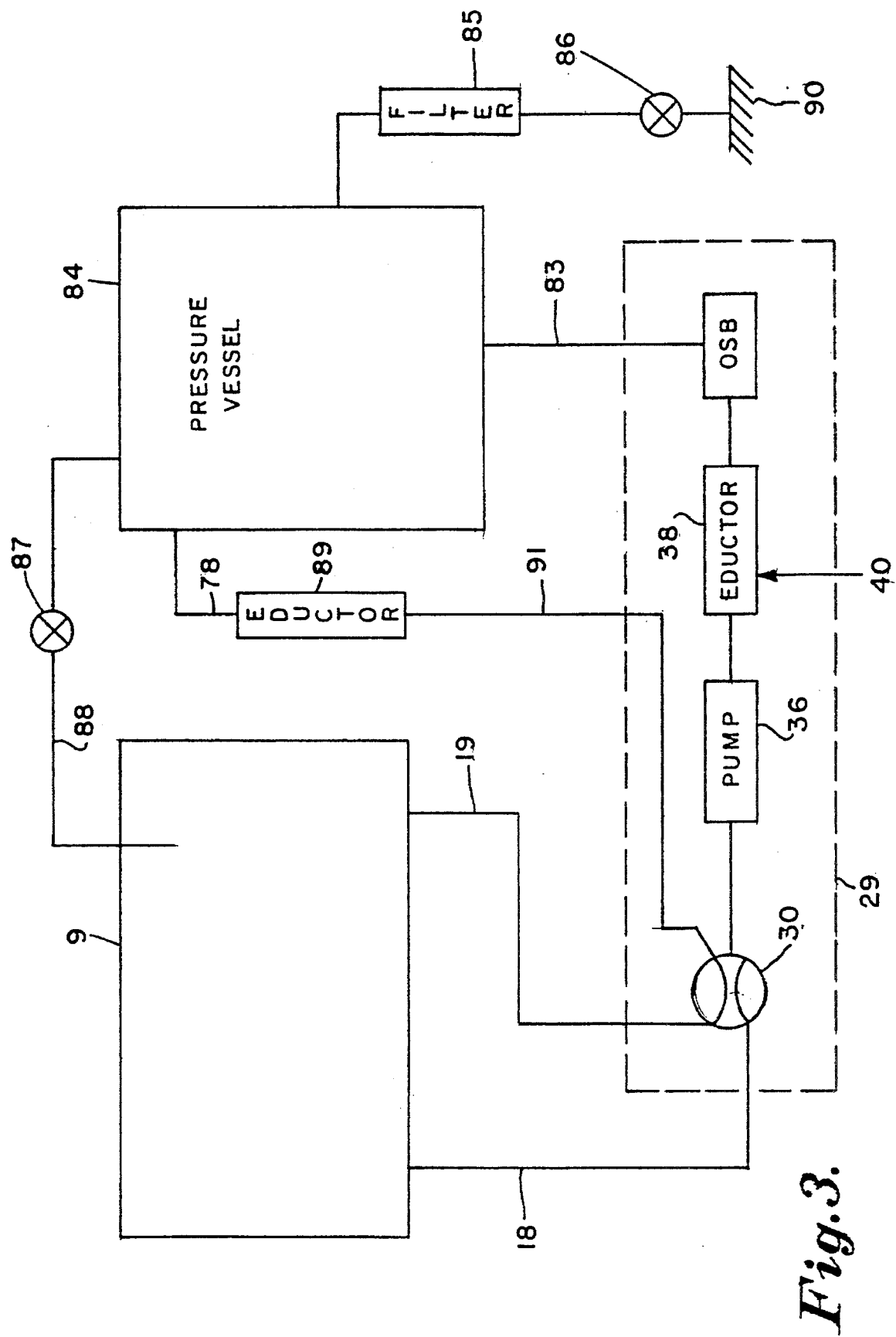
FIG. 3 is schematic representation of the FIG. 1 tank containing a pressure vessel within the circulation loop for increasing the oxygen content in the aerated mixed liquor.

Referring to FIG. 3 there is shown the tank 9 and mixed liquor leaving the tank 9 through pipe 18. The exiting mixed liquor passes through the reversing valve 30, to a pump 36, which for the purposes of this discussion, builds up the pressure in the mixed liquor leaving the pump to 30 pounds per square inch.

The pressurized mixed liquor flows to an eductor 38 where it is mixed with incoming air from pipe 40. In this illustration the mixed liquor is coupled through an OSB to increase the mixing of the air and mixed liquor. An OSB is described and claimed in U.S. Pat. No. 4,874,509.

The now oxygen enriched and pressurized mixed liquor flows through pipe 83 to a sealed tank which typically will hold about 100 gallons at 30 pounds per square inch for the residential uses discussed above.

At atmospheric pressure the amount of dissolved oxygen is 9 to 10 parts per million whereas at 30 pounds per square inch of pressure the dissolved oxygen reaches levels of 40–50 parts per million.

A portion of the pressurized mixed liquor is drawn from the pressurized tank 84 and coupled through pipe 78 to a pressure relief eductor 89 where the pressure is reduced to control the flow of mixed liquor through the tank 9. The mixed liquor flows from the eductor 89 through pipe 91, through the reversing valve 30 and into tank 9 via pipe 19.

Pressure in the tank is maintained constant by means of a pressure relief valve 87 which removes excess air from the pressurized tank 84 and transfers the excess air to the tank tank 9 by means of pipe 88. Treated mixed liquor in this instance is withdrawn from the pressurized tank 84 through filter 85 and valve 86 to the dispersing field 87.

The biological treatment taking place within the circulation loop 29 is accelerated by the increased amount of dissolved oxygen accompanying the increase in pressure. The pressurized tank which may typically be about 100 gallons for the small systems under consideration here, provides added residence time for the microorganisms and mixed liquor under more favorable digestive conditions, i.e. increased dissolved oxygen.

In summary, the sewage treatment tank system 10 includes filtering and backwashing of filters which cooperates with a recirculation loop for continuously supplying dissolved oxygen to the mixed liquor in the tank during biological treatment of the mixed liquor. The tank system 10 includes both aerobic and anaerobic digestion by microorganisms which provide secondary and advanced sewage treatment. Improved digestion is also accomplished by providing sites for attached growth in the filters.

A pressurized tank may be placed in the recirculation loop for increasing the concentration of dissolved oxygen in the mixed liquor being circulated.

While the invention has been particularly shown and described with reference to preferred embodiments thereof, It will be understood by those skilled in the art that various changes in form and details may be made therein without departing from the spirit and scope of the invention as defined by the appended claims.

We claim:

1. A method of operating a batch sewage treatment reactor tank assembly wherein biological treatment is accomplished on a batch of sewage introduced into the reactor tank by circulating aerated mixed liquor through attached growth filters and through a settling tank comprising the steps of:

providing a sewage treatment reactor tank containing mixed liquor containing aerobic microorganisms for biologically treating sewage, said reactor tank further containing spaced apart first and second attached growth filters submerged in the mixed liquor, said submerged attached growth filters being separated by a settling tank, said attached growth filters and said settling tank being in series fluid communication, providing a control means having timing means for controlling the process, an influent pipe coupled to said reactor tank for supplying a batch of raw sewage to said reactor tank, and an effluent valve coupled to the reactor tank for discharging treated aerated effluent from the reactor tank, the effluent valve being controlled by the timing circuit, supplying a batch of raw sewage to the reactor tank, actuating said timing means to start a continuous circulating flow pattern of mixed liquor by continuously removing a portion of the mixed liquor in the reactor tank after said first attached growth filter, aerating the portion of mixed liquor removed and returning the aerated mixed liquor to the second attached growth filter, said circulating flow pattern then continuing in succession through said second attached growth filter, through said settling tank, and then through said first attached growth filter to complete the circulating flow pattern, continuously maintaining said circulating flow pattern of aerated mixed liquor for a predetermined time to produce treated aerated effluent, actuating the timing means for opening the effluent valve at end of said predetermined time for interrupting the circulating flow pattern by discharging said batch of treated aerated effluent from the reactor tank, and stopping the circulating flow and closing the effluent valve to complete the batch treatment cycle.

2. The process of claim 1 wherein the attached growth filters are constructed of media of about 1 to 2 inches in diameter.

3. The process of claim 1 wherein the reactor tank has a capacity of 1100 gallons, a typical batch of 300 gallons, a mixed liquor flow rate of 5 gallons per minute and a treatment time of 6 hours.

4. The process of claim 1 wherein said mixed liquor removed from the reactor tank is aerated in an eductor.

5. The process of claim 1 wherein the aerated mixed liquor is pressurized to increase the quantity of dissolved oxygen before it is returned to the reactor tank.

6. A biological sewage treatment reactor assembly comprising:

a reactor tank having
a) influent pipe means for supplying raw sewage to the reactor tank,
b) a quantity of mixed liquor containing biological microorganisms for digesting sewage,
c) first and second spaced apart attached growth filters submerged in said mixed liquor,
d) a settling tank containing mixed liquor situated between said first and second attached growth filters, said attached growth filters and settling tank being in series fluid communication, to direct the flow of mixed liquor from the first attached growth filter, through the settling tank and then through the second attached growth filter, in succession.

a circulating loop for removing a portion of mixed liquor from the reactor tank and for returning aerated mixed liquor to the reactor tank, said circulating loop having,
a) pump means with an inlet and outlet
b) first conduit means coupled between said second attached growth filter and said pump inlet means for removing mixed liquor from the reactor tank through said second attached growth filter,
c) aerating means having second inlet means and second outlet means, said second inlet means connected to the outlet of said pump for receiving and for aerating said mixed liquor removed from the settling reactor,
d) second conduit means coupled between said second outlet of said aerating means and said first attached growth filter for returning aerated mixed liquor to the settling tank through said first attached growth filter,
e) an effluent valve means coupled to said second conduit means for removing treated aerated liquor as effluent from the reactor tank, and control means, including a timing means for controlling in sequence,
a) supplying a batch of raw sewage to said influent conduit,
b) activating the pump for a predetermined time to continuously circulate mixed liquor through the reactor tank and circulating loop for biologically treating said mixed liquor for producing treated aerated mixed liquor,
c) opening said effluent valve for removing a batch of treated aerated mixed liquor,
d) closing said effluent valve, and
e) turning off the pump.

7. A sewage treatment reactor assembly as defined in claim 6 where in the attached growth filters are constructed from coarse media of 1 to 2 inches in diameter.

8. The sewage treatment reactor assembly as defined in claim 6 wherein the reactor tank has a capacity of 1100 gallons, a typical batch of 300 gallons, a mixed liquor flow rate of 5 gallons per minute and a treatment time of 6 hours.

9. A sewage treatment reactor assembly as defined in claim 6 wherein a pressurized tank is inserted between the aerating means and the first attached growth filter for increasing the amount of oxygen in the aerated mixed liquor.

10. A sewage treatment reactor assembly as defined in claim 6 which includes in addition fluid switching means for periodically reversing the flow of mixed liquor in the attached growth filters.

* * * * *